United States Patent [19]
McKeon et al.

[11] 3,762,337
[45] Oct. 2, 1973

[54] RAILED VEHICLE-CARRIER SYSTEM

[75] Inventors: John Francis McKeon; Danforth Kingsbury Heiple; Louis Eugene Carr, all of Peoria, Ill.

[73] Assignee: Westinghouse Air Brake Company, Peoria, Ill.

[22] Filed: July 19, 1971

[21] Appl. No.: 163,692

[52] U.S. Cl.......... 105/159, 105/199 C, 105/215 C, 308/137
[51] Int. Cl... B61d 15/00, B62d 61/12, F16c 17/08
[58] Field of Search.................. 105/49, 158 R, 159, 105/215 R, 215 C, 366 R, 199 C; 214/515; 280/425, 477; 308/137

[56] References Cited
UNITED STATES PATENTS

| | | | |
|---|---|---|---|
| 1,280,140 | 10/1918 | Bonner | 105/159 |
| 3,228,350 | 1/1966 | Cox | 105/215 C |
| 3,263,628 | 8/1966 | Grove et al. | 105/215 C |
| 1,897,277 | 2/1933 | Reinhart et al. | 105/215 C |
| 2,129,340 | 9/1938 | Webber | 214/515 |
| 2,436,240 | 2/1948 | Wiertz | 105/159 X |
| 1,512,755 | 10/1924 | Galbraith | 105/215 C |
| 2,889,785 | 6/1959 | Browne | 105/215 C |
| 3,198,138 | 8/1965 | Melcher | 105/49 |

Primary Examiner—Robert G. Sheridan
Assistant Examiner—Howard Beltran
Attorney—Frank E. Wattles

[57] ABSTRACT

A railroad dolly and truck equipped to have its front wheels supported upon the dolly off the ground and its rear wheels partially supported by the dolly with sufficient contact with the ground to power and brake the dolly. The truck is equipped with a hydraulic lift suspended from the front undercarriage and a similar lift suspended from the rear undercarriage. The lift has a wegde-shaped member mounted at the free end of the lift. The dolly includes a front dolly section and a rear dolly section. The sections are flexibly linked to each other and have railroad wheels adapted to ride conventional rails. Each section has a trough mounted on its frame. The trough is vee-shaped and mates with the lift wedge. The front lift centers within the front dolly trough and raises the truck tires off the ground. The rear lift centers within the rear dolly trough and raises the truck partially or completely off the ground. The truck is equipped with signalling devices to fix its proper location over the dolly before mounting the dolly in a hydraulic system to supply the power to the lift necessary to raise the truck. Hooks are provided underneath the truck to grip the dolly during transportation between rail locations. Each dolly has its own braking system.

11 Claims, 20 Drawing Figures

INVENTORS
JOHN F. McKEON
DANFORTH K. HEIPLE
LOUIS E. CARR
BY
FRANK E. WATTLES ATTORNEY

PATENTED OCT 2 1973 3,762,337

INVENTORS
JOHN F. McKEON
DANFORTH K. HEIPLE
LOUIS E. CARR
BY
FRANK E. WATTLES ATTORNEY

INVENTORS
JOHN F. McKEON
DANFORTH K. HEIPLE
LOUIS E. CARR

BY

FRANK E. WATTLES   ATTORNEY

RAILED VEHICLE-CARRIER SYSTEM

BACKGROUND OF THE INVENTION

I. Fields of the Invention

This invention relates to vehicles of the kind adapted to travel either on roads or on rails, and more particularly, to a rail dolly mounted motor vehicle having supporting front flanged wheels and rear flanged wheels and pneumatic tired wheels with suspended front pneumatic tired wheels.

II. Description of the Prior Art

Vehicles which travel over rails and roads are well known. Rails provide a positive guidance and stability for vehicles while roadways have better tractive characteristics for heavy load hauling up steep grades.

Vehicles having both road tires and rail wheels mounted upon the vehicle are well known also. Carrying an extra set of wheels for conversion of the vehicle to one of the two types of surface adds substantial weight to the vehicle. The added weight increases tire wear for road tires which are expensive to replace. To minimize tire wear weight must be minimized. Vehicles which attach an extra set of wheels for conversion to the appropriate surface require substantial clearance beneath the vehicle and when the added wheels are affixed, the vehicle has minimum clearance making travel on irregular surfaces with bumps and rocks and the like difficult with high risk of damage to the vehicle. Some of these conventional vehicles build a special roadway for the pneumatic tired wheels and flanged wheels, but this is expensive and limits the flexibility of the vehicle without reducing wear to the tires.

Conventional vehicles provide portable rail wheels which are removed during transportation on a roadway. These vehicles do not use tires while transporting by rail. The tires are elevated above the ground, thus reducing the capability of heavy load carrying vehicles.

Patents illustrating the prior art described above are:

| | |
|---|---|
| Motorized Railroad Trucks | 3,198,138 |
| Road-Rail Vehicle | 2,889,785 |
| Vehicle | 1,897,277 |
| Transportation System | 1,280,140 |

The problems and disadvantages of the conventional art are overcome by this invention. The dolly with rail wheels is portably combined with a tire vehicle for transportation on both road surfaces and rail surfaces. A hydraulic system operates two lifts and raises the vehicle over the dolly for use on rails; however, the front tires only are elevated above the ground, the rear tires being elevated sufficiently to reduce some load on the tires but maintaining contact with the ground and sufficient load to obtain proper traction. Only the rear tires receive wear while the vehicle is transported over rails. This wear is minimized by maximizing traction. The vehicle has substantial flexibility because the traction on rails can be selected by selecting the load on front or rear tires or eliminating traction altogether. The dolly can be removed from the vehicle for normal roadway transportation. The details of the device providing these unique advantages will be described hereafter.

SUMMARY OF THE INVENTION

Briefly, the invention provides a vehicle for transportation on roadways and railways. There is provided in combination two rails which are located on a supporting surface and a carrier assembly mounted upon the rails. The carrier assembly has front and rear rail wheels adapted for transportation upon the rails. A motor vehicle is provided having front and rear road wheels. The vehicle is supported upon the carrier assembly but the front road wheels raised off the ground and the rear road wheels supported partially on the ground and partially on the carrier. Means are provided for lifting and lowering the front road wheels and additional means are provided for lifting and lowering the rear road wheels.

DESCRIPTION OF PREFERRED EMBODIMENTS

Figure 1:
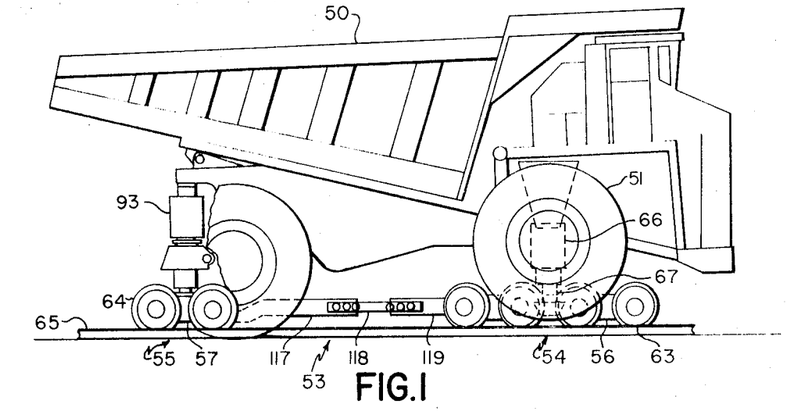
FIG. 1 shows the truck partially upon carrier assembly.
Figures 2, 3:
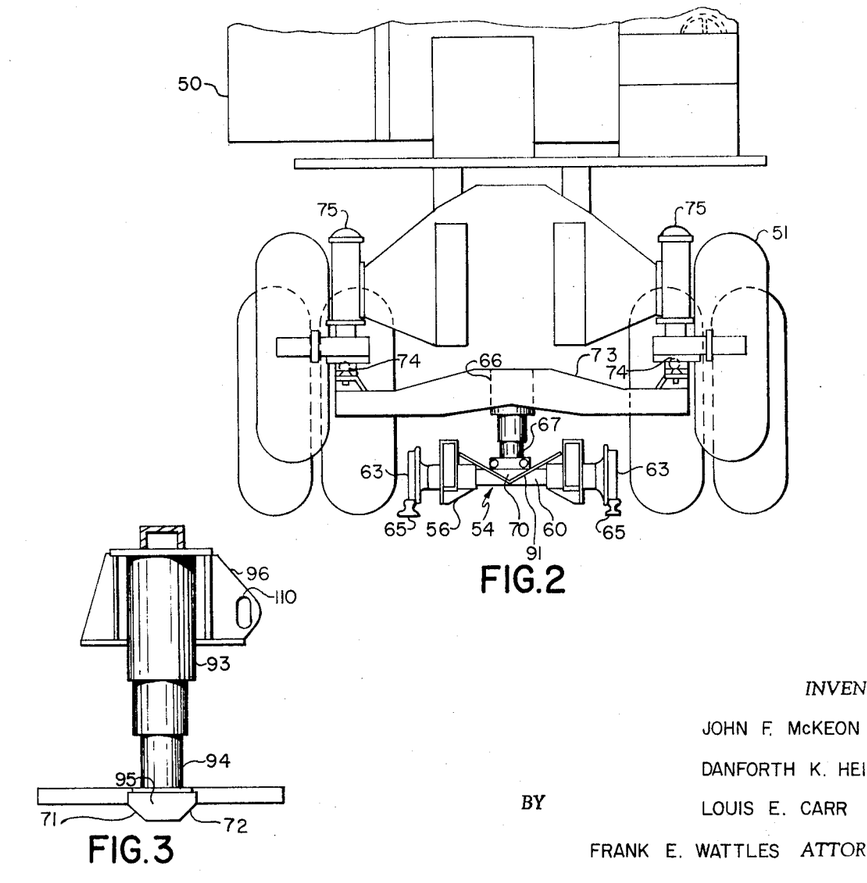
FIG. 2 shows a front view of the configuration of FIG. 1.
FIG. 3 shows an elevation view of a hydraulic lift cylinder mounted on rear crossbeam of the truck.

Referring now to the drawings, FIG. 1 illustrates a conventional two-axle truck 50 with pneumatic front tires 51 and pneumatic rear tires 52 resting upon a carrier assembly 53 disposed beneath truck 50. FIG. 2 shows a front view of the truck 50 upon carrier assembly 53. Assembly 53 comprises a front carrier 54 and a rear carrier 55. Respectively carriers 54, 55 have frames 56, 57 mounted upon axles 60, 61 connected to conventional railroad wheels 63, 64 adapted to rotate upon conventional railroad rails 65.

Figure 4:
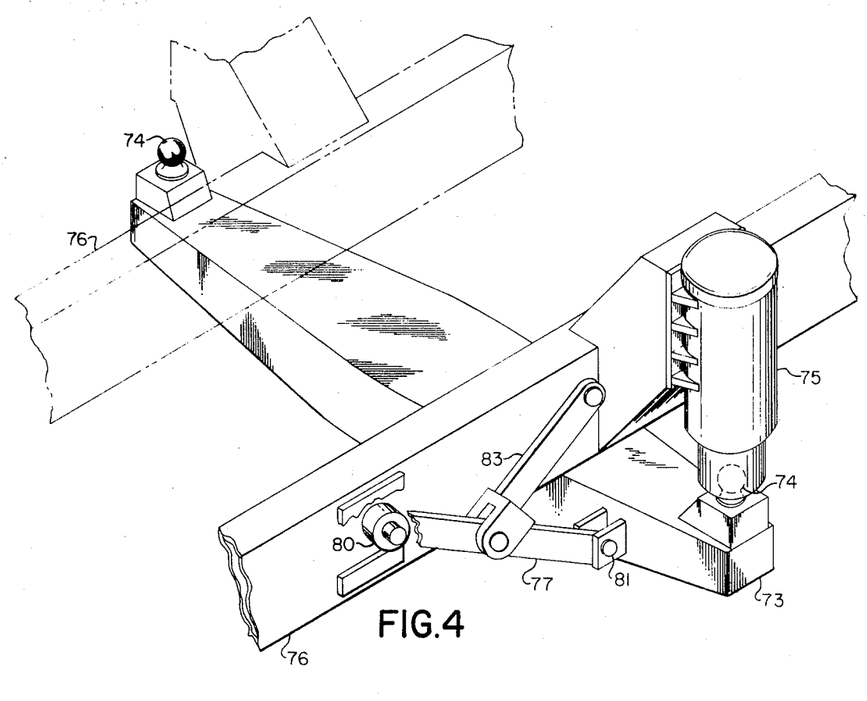
FIG. 4 shows one embodiment in perspective of a front crossbeam mounted on a truck frame.
Figure 5:
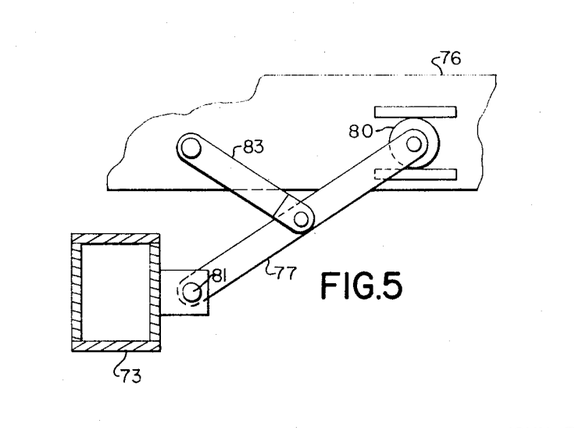
FIG. 5 shows linkage for the embodiment of FIG. 4.

A hydraulic cylinder 66 is disposed between the front portion of the frame of the truck and front carrier 54. The cylinder 66 may be affixed to the frame of truck 50 or to front carrier 54. The cylinder 66 includes an extendible piston 67 similar to the piston shown in detail in FIG. 3. A wedge 70 is affixed to the free end of piston 67. Angled surfaces similar to 71, 72 in FIG. 3 are formed on the wedge 70 and are adapted to nest upon complementary surfaces of a V shaped trough. A front cross beam 73 forms a part of front portion of the frame of the truck 50. Ball joints 74 each are connected to beam 73 near the ends of the beam and the ball joints 74 are connected to the bottom of respective front suspensions 75 of the truck 50 so that beam 73 will hang from suspension 75. An alternate connection of beam 73 to suspension 75 is illustrated in the FIGS. 4, 5. Ball joints 74 are connected to suspensions 75 which are supported on frames 76. Beam 73, connected to ball joints 74, also is connected to frames 76 by respective links 77 which are rotatably connected at location 80 on frames 76 to provide two-direction movement at one end of link 77. The other ends of links 77 are pivotally connected to beam 73 at pivots 81. Links 77 are pivotally connected at mid-points thereof to other links 83, the other ends of which are pivotally connected to frames 76. One representative link assembly has been shown in FIG. 4 at one end of beam 73, but it is to be understood that another identical link assembly is located at the other end of beam 73. According to the alternate beam connection of FIGS. 4, 5 rotation of beam 73 relative to frame 76 is allowed in a forward or a backward direction upon ball joints 74 and as shown by the arrows of FIG. 5.

Front carrier 54 has a plurality of railroad wheels 63, pairs of wheels being connected by axles 60. A frame 56 is mounted upon wheel 63 connecting the wheels so they rotate in a fixed position relative to the frame. A V shaped trough 91 forms a part of the frame 56 and is located at the mid-support of the plurality of wheels 63. The inside surfaces of the trough 91 are at an angle complementary to the angled surfaces of wedge 70 to provide continuous contact of the wedge and trough surfaces.

Figure 6:
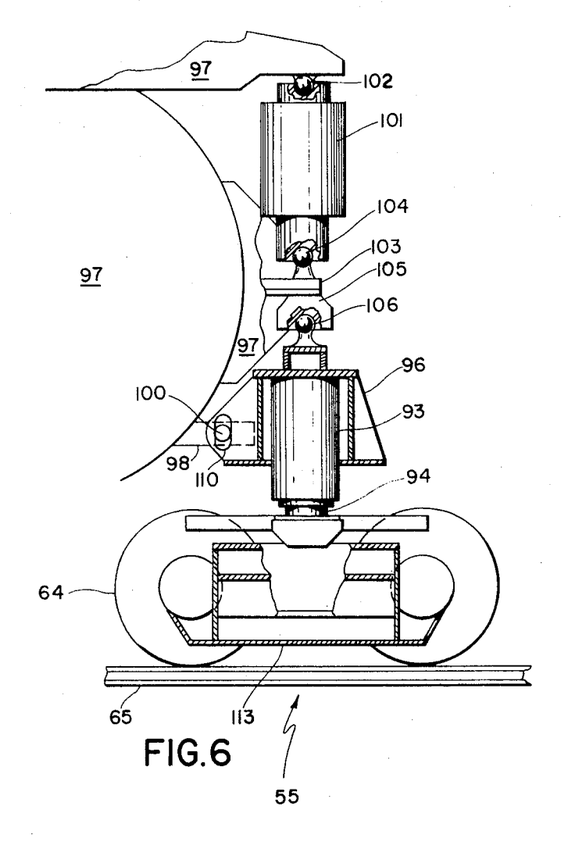
FIG. 6 shows an elevation view of a hydraulic lift cylinder positioned over a rear carrier.

A hydraulic cylinder 93 is disposed between the rear portion of the frame of truck 50 and the rear carrier 55. Cylinder 93 is affixed to the frame of the turck 50 as illustrated in FIGS. 1, 6, but may be affixed to carrier 55 in the alternative as described hereinafter. Cylinder 93 includes an extendible piston 94 (FIG. 3). A wedge 95 is affixed to the free end of piston 94. Angle surfaces 71, 72 are formed on the wedge and are adapted to rest upon complementary surfaces of a V shaped trough. A rear cross beam 96 forms a part of the rear portion of the frame 97 of the truck 50. A bar 98 extends out from frame 97 and has pins 100 located on both sides thereof. Rear suspensions 101 hang from ball joints 102 formed on frame 97. Adaptor plates 103 are affixed to the frame 97 and extend below suspensions 101. Ball joints 104 are affixed to the upper sides of plates 103 in a position to receive making sockets of the bottom of suspensions 101. Sockets 105 are affixed to the lower sides of plates 103. Ball joints 106 each are connected to beam 96 near the ends of the beam, and the ball joints 106 are inserted within sockets 105. Cylinder 93 is affixed to frame 97 and beam 96 has slotted guides 110 within which pins 100 ride, the slot allowing vertical movement of beam 96 and cylinder 93 relative to bars 98 and frame 97.

Rear carrier 55 is similar in construction to front carrier 54 and comprises a plurality of railroad wheels 64 connected in pairs by axle 61. A frame 113 is mounted upon wheels 64 in the conventional manner. A V shaped trough 114 forms a part of frame 113 and is located at the mid-support location of the plurality of wheels 64. The inside surfaces of the trough 114 are at an angle complementary to the angle surfaces 71, 72 of wedge 95 to provide continuous contact of the wedge and trough surfaces.

Figure 7:
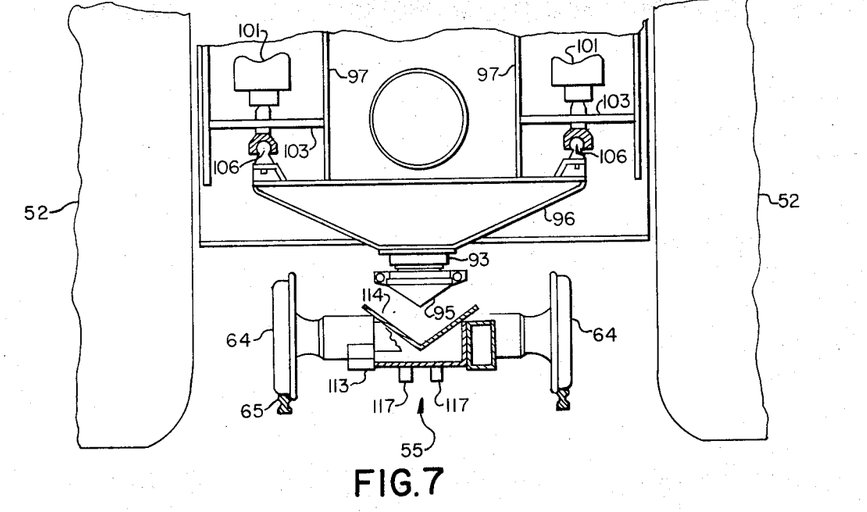
FIG. 7 shows a rear view of a truck positioned over a rear carrier.
Figure 8:
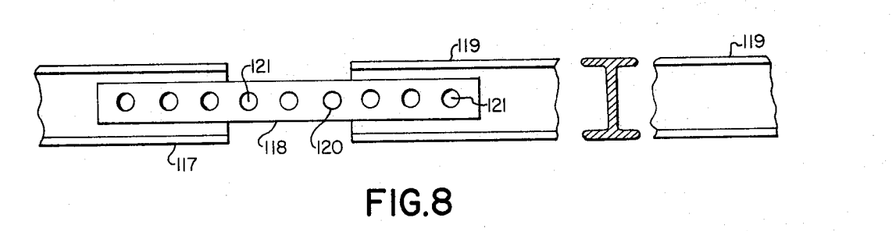
FIG. 8 shows linkage between carriers.

Front carrier 54 and rear carrier 55 are joined together to form carrier assembly 53 by links 117, 118, 119 illustrated in FIGS. 1, 8. Links 117, 119 are I-beams of a material and size to allow flexing sufficient to follow a curve in rail track 65, the three links 117, 118, 119 bowing in combination to an arc. Link 118 is similarly of a flexible material. I-beams 117, 119 are solidly affixed to the rear carrier 55 and front carrier 54 respectively at one end. The connection at the front carrier 54 is at a mid-point between the wheels and toward the rear and is pivotally made. A single link 119 joins the pivotal connection at carrier 54 to link 118 at the other end. Link 117 comprises two identical links solidly affixed along the mid-support location as shown in FIG. 7 with each link 117 connected at one end to link 118, extending from the mid-point of such connection in a Y-manner toward the rear wheels 64 and then bending to direct the links under the carrier toward the mid-support location. The links are welded, or other like solid attachment provided, to the bottom of the rear carrier 55. Link 118 has holes 120 there through and pins 121 upon links 117, 119 pass through holes 120 to pivotally secure links 118 at its ends to links 117, 119. A plurality of holes 120 are spaced to provide selection of the distance between links 117, 119 and thus to adjust the relative position of front carrier 54 to rear carrier 55.

Truck 50 is driven over the carrier assembly 53 and the position of hydraulic cylinders 66, 93 adjusted relative to trough 91, 114 by adjusting the distance between carrier 54, 55 and by adjusting the position of carrier assembly 53. Hydraulic pressure is applied to cylinder 66 to extend piston 67 toward trough 91. The front portion of truck 50 will be lifted and tires 51 may be lifted off the gound with sufficient extension of piston 67. As wedge 70 presses downward against trough 91, the weight of the truck will cause the wedge to displace sidewards and downwards until the wedge is at the lowest point of the trough and the truck is centered over the front carrier 54. In a similar manner, hydraulic pressure is applied to cylinder 93 until piston 94 presses downward against trough 114 and the rear of the truck is lifted. In operation, the rear of the truck may be lifted entirely off the ground or partially lifted to relieve some weight from the rear tires while maintaining tire contact with the ground. Tire contact is maintained so the braking system of the truck can be used to slow the truck and carrier assembly. The means for applying pressure to the hydraulic cylinders is described later in this description.

Figures 9, 10:
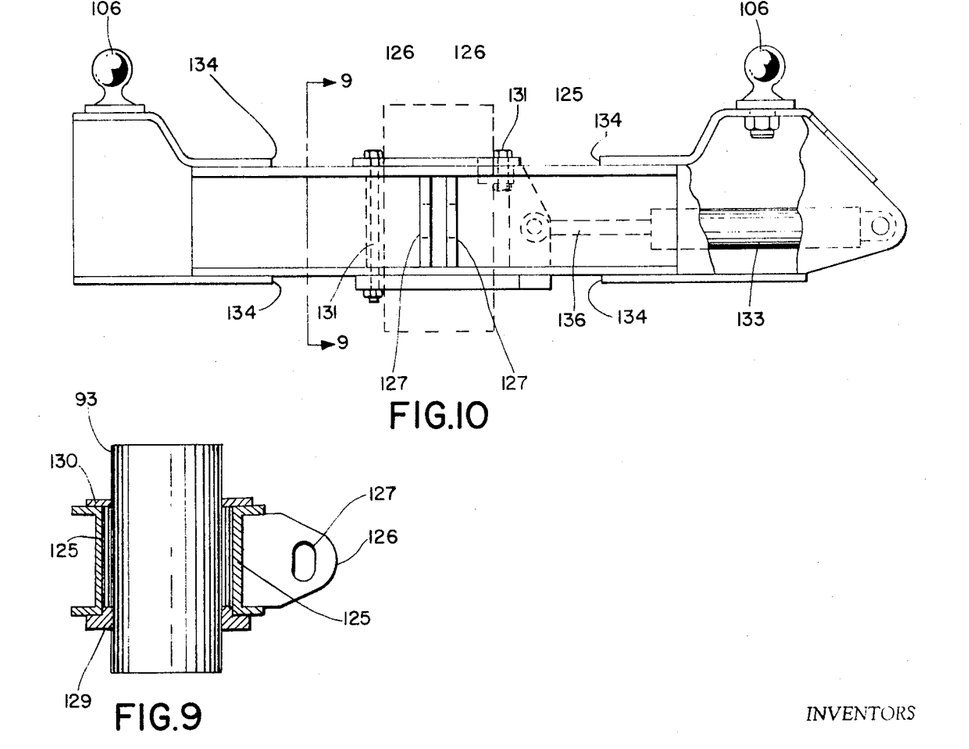
FIG. 9 shows the sectioned view on lines 9—9 of the crossbeam.
FIG. 10 shows an elevation view of the crossbeam on FIG. 9.
Figure 11:
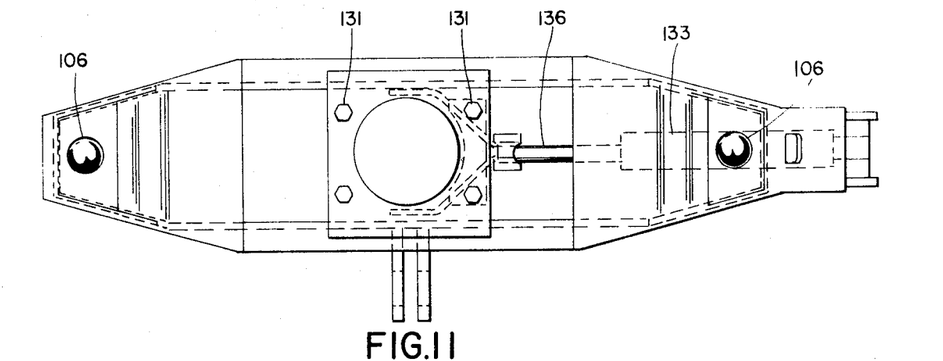
FIG. 11 shows a plan view of the crossbeam of FIG. 9, 10.

To provide a fast shifting movement of cross beam 96 to allow shifting of the rear of truck 50 to the sides as the truck is being moved around a curve in the railroad track, the crossbeam 96 and its connections illustrated in FIGS. 3, 6 can be modified as illustrated in FIGS. 9, 10, 11. In substitution of the bar 98, slot 110 and pin 100 as means for vertical shifting beam 96, a similar beam 125 has attached thereto holders 126, with aperture 127 for receiving a pin (not shown) thereto. Holders 126 are spaced apart and apertures 127 on a line. Aperture flanges (not shown) are affixed to frame 97 so that the pin will pass through the flanged apertures and apertures 127. To rotatively connect beam 125 to frame 97. Thus, beam 125 will rotate on the pin and in a forward and backward direction about all joints 106. An aperture 128 passes thereto having a larger diameter than cylinder 93. A bottom plate having an aperture substantially the same size as cylinder 93 is fastened to the cylinder. The top plate 130 is placed around cylinder 93 and bolts 131 connect bottom and top plates 129, 130 to hold them together. Plates 129 and 130 ride upon beam 125 and are guided laterally by the bolts 131. A bias means illustrated by hydraulic cylinder 133 is connected to cylinder 93 at one end and to beam 125 at the other end. Stops 134 limit lateral movement of cylinder 93 and plates 129, 130, when the plates encounter the stop obstacle. Otherwise, beam 125 is similar to beam 96 and is identically suspended on ball joints 106. A side shift of cylinder 93 relative to beam 125 will extend or retract piston 136 of cylinder 133. The truck 50 can act in the spots to the force of a turn or bend of the moving truck and cylinder 93 will shift relative to beam 125. Cylinder 133 will operate to return the cylinder to its normal centered position. A heavy spring can be employed in lieu of cylinder 133. With the cylinder 133 externally operated, for example from the cab of a truck, the rear of the truck 50 could be shifted by activating cylinder 133. A conventional hydraulic supply system would be used with an adjustment control operatively connected to interconnected hydraulic pump, valve and cylinder 133. The scope of the invention is not limited to the embodiment described but includes obvious alternatives such as using two opposing hydraulic cylinders in lieu of a single cylinder 133.

Figure 12:
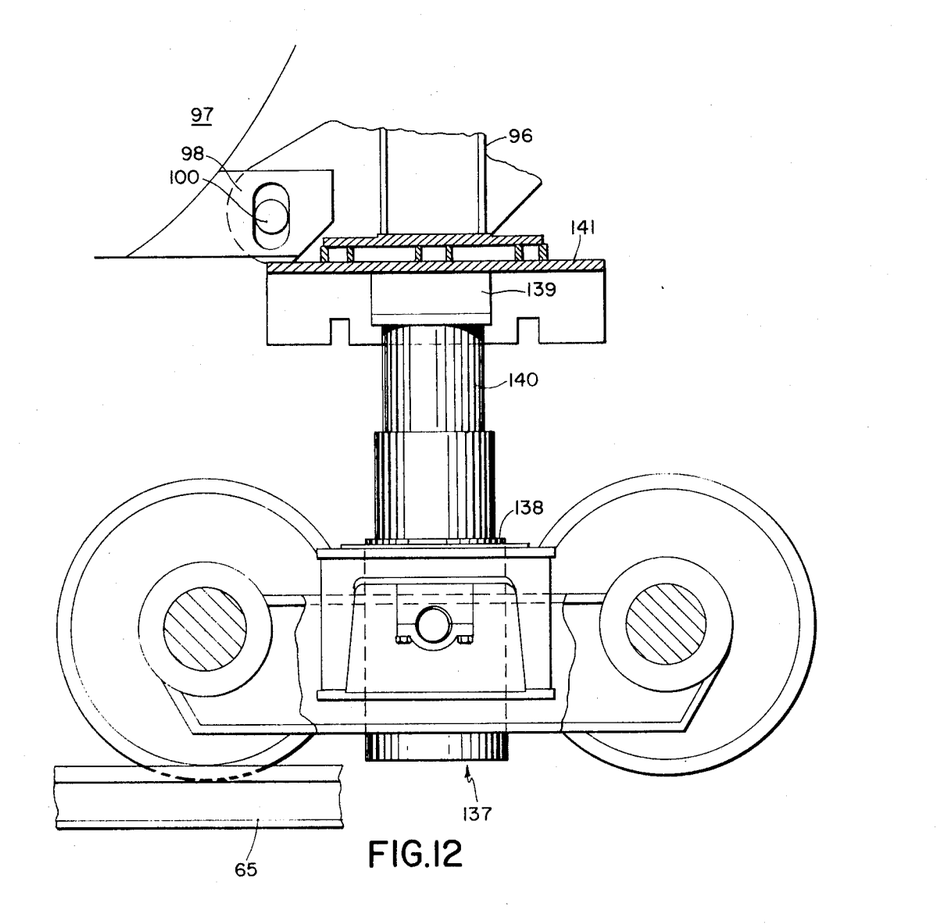
FIG. 12 shows an elevation view of the rear carrier with mounted hydraulic lift cylinder.
Figure 13:
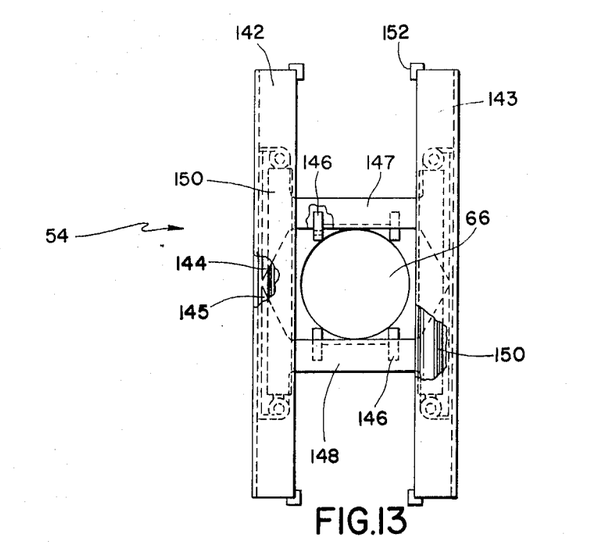
FIG. 13 shows a plan view of gripping means and a portable front carrier.
Figure 14:
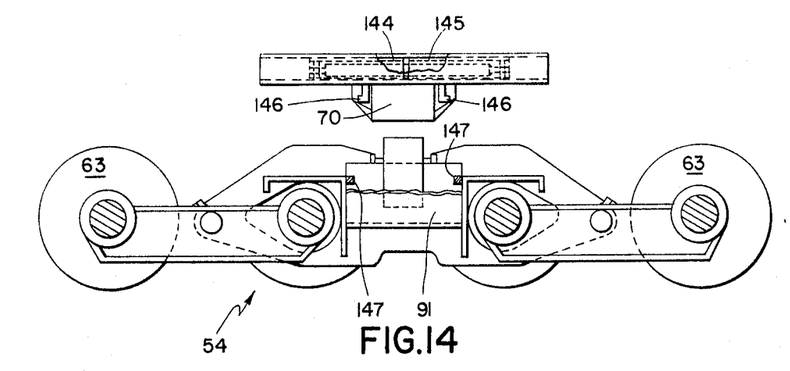
FIG. 14 shows an elevation view of the configuration of FIG. 13.

The location of cylinder 93 and wedge 95 fastened to rear crossbeam 96 above V shaped trough 114 located on rear cylinder 55 is illustrated in FIGS. 6, 9, 10, 11. This embodiment can be modified to locate the rear hydraulic cylinder on the rear carrier as illustrated in FIG. 12. Rear carrier 137 similar to carrier 55 has mounted thereon cylinder 138 with wedge 139 mounted upon the upward extending piston 140. The V shaped trough 141 is affixed beneath rear crossbeam 96. Pins 100 connected to bar 98 and frame 97 support beam 96 in the same locatable manner as illustrated above for the embodiment of FIG. 6. The beam 96 is suspended from ball joint 106 (FIG. 6) and rotates thereon in a forward and backward direction. The wedge 95 within trough 141 and the truck 50 is centered therein upon extension of piston 140 in the same manner as described for the oppositely directed lift assembly of cylinder, piston, wedge and trough of FIG. 6. A similarly modified lifter assembly mounted on a front carrier 54 is apparent in view of the embodiments of FIG. 12 applied to such a lifter assembly mounted on the back carrier 55. FIGS. 13, 14 illustrate a means for gripping the carriers below the truck. The gripping means supports the carrier assembly 53 during road transport from one railroad track to another. The means for gripping the carrier is provided by two H shaped frames 144, 145 placed in position together to form an H shaped frame with two crossbars 147, 148 and channelled legs extending lengthwise over the carrier slightly above wedge 70 around the bottom of cylinder 66. The legs of the double H frame are nested in a larger channelled frame of similar shape and slightly larger, one frame 142 containing adjacent legs of H frame 148, 144 145, another frame 143 containing the other two adjacent legs, of the same H frame. Four hooks 146 are fastened beneath the two crossbars of the double H frame and are adapted to be pressed under four complementary flanges 147 fastened to the frame of carrier 54 and located near the end of trough 91. Two double-acting hydraulic cylinders 150 interconnect the two pairs of adjacent legs, to frames 144, 145 so that when cylinders 150 are extended the H frames 144, 145 separate together with crossbars 147, 148 and hooks 146, are forced away from the transverse metal of carrier 54 and under flanges 147. The frame of carrier 54 is supported upon flanges 147 and is hooked to the frame of truck 50, and can be transported therewith. Carrier 54 is released by retracting cylinders 150 to form H frames 144, 145 together and withdraw hooks 146 from beneath flanges 147. It is apparent that a similar grouping means can be employed to hold rear carrier 55 to carrier assembly 53 when both gripping means are simultaneously employed.

Figure 15:
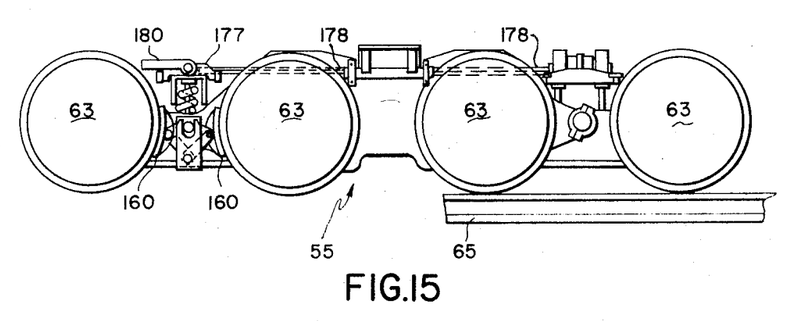
FIG. 15 shows an elevation view of the braking system on a front carrier.
Figure 16:
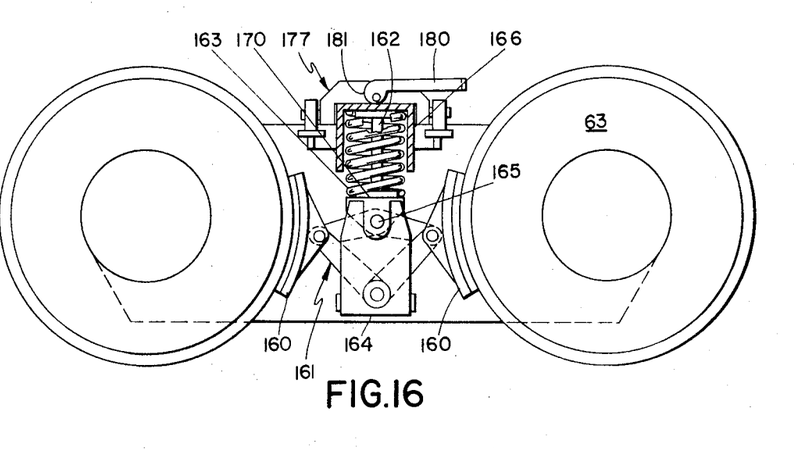
FIG. 16 shows the brakes of the carrier.
Figure 17:
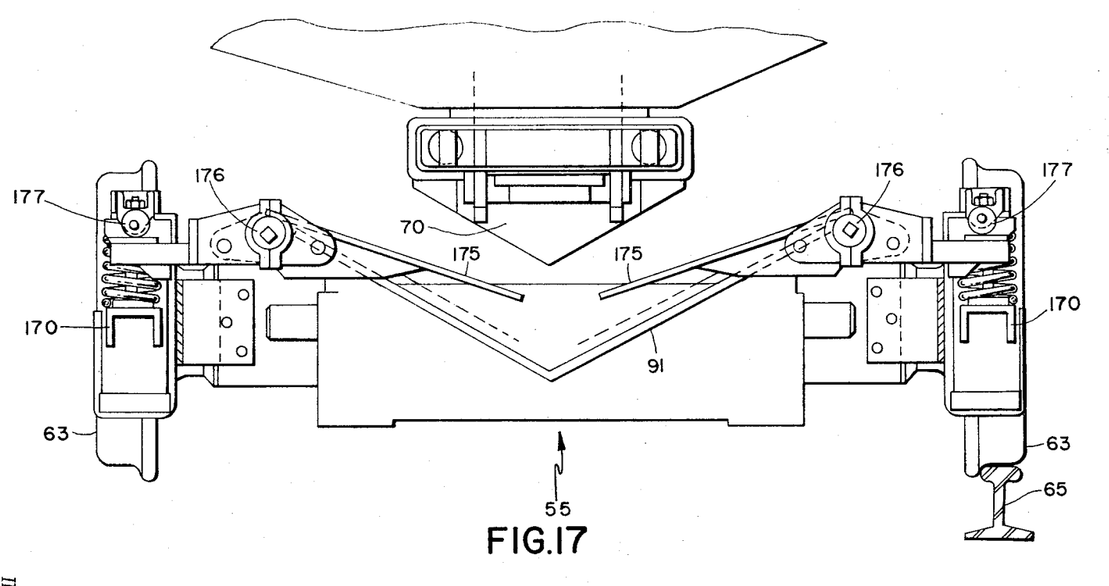
FIG. 17 shows a front view of the carrier with brakes.

Parking brake upon the front carrier 54 is illustrated in FIGS. 15, 16 and a similar brake for the front carrier 54 or rear carrier 55 is illustrated in FIG. 17. The brake system comprises brake shoes 160 adapted to be held tightly against wheels 63. Shoes 160 are connected to linkage 161 which is pivotally attached to a spring rod 162 and spring 163. Linkage 161, spring rod 162, and spring 163 are operatively connected to a guide 164 which maintains the center of linkage 161, midway between the two wheels 63. Pin 165 located at pivot of linkage 161 rides within a slot of guide 164, and the guide moves vertically, with the motion of rod 162, thus maintaining the linkage in position. The plate 66 is mounted at one end of rod 162, the rod passing through the plate. The rod 162 is secured at its other end to a plate 170. Plate 166 slides along rod 162 under application of force and the spring 163 located between the plates biases the lower plate 170 and rod 172 to reposition linkage 161 and shoes 160. With the linkage 161 in the lower position illustrated in dotted lines in FIG. 16, the shoes 160 are withdrawn from contact with tires 63, allowing free rotation. When the linkage is in the upper position illustrated by solid line in FIG. 16, shoes 160 are tightly in contact with wheel 63 and the carrier is locked.

Two means for moving plate 166 and repositioning linkage 161 are illustrated. In the front carriage 54 of the FIGS. 15, 16, 17 wedge 70 is extended into trough 91 as discussed above. A panel 175 is connected to a spring 176. Panel 175 has one end rotated eccentrically to produce cam surface 177. A panel 175 is located at both ends of trough 91. Normally, without the weight of wedge 70 to depress panel 175, spring 176 rotates panel 175 upon cam surface 177. A linkage 178 connects each panel 175 with cam surface 177 and the surface does not depress spring 163 and in this position, linkage 161 is in an upper position thereby setting the carrier brake in a locked position. The wedge 70 is inserted in the trough 91 only when truck 50 is mounted upon the carrier. It is apparent that the carrier will have its brake set whenever the truck is not upon the carrier. By contrast when wedge 70 depresses panels 170 into trough 91, linkage 178 and cam surface 177 are rotated re-positioning linkage 161 to unlock the brakes and allow free movement of the carrier. A second means for operating the brakes is a manual means. Lever 180 is pivotally connected to the upper end of rod 162, the surface around the pivot being eccentric to form a cam surface 181. Upon rotation of lever 180 upon its pivot, surface 181 acts to reposition plate 166 and brake shoes 160 in the same manner as described above for the panel 175.

Figure 18:
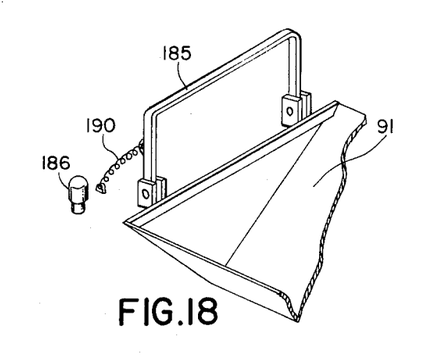
FIG. 18 shows a perspective view of positioned detector.
Figure 19:
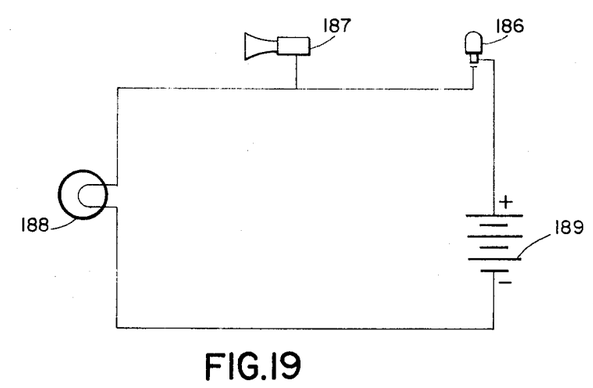
FIG. 19 shows circuit diagram of a posion detector and signal device.

A means to accurately position the truck 50 and wedge 70 over trough 91 is illustrated in FIGS. 18, 19. As the wedge 70 is extended toward trough 91, a wall of the wedge 70 may touch arm 185 which is caused to rotate against an end of the trough 91, upon which it is mounted. The arm is contact with the trough 91 completes an electric circuit as illustrated by the switch 186 in FIG. 19. Power source 189 provides the energy of the circuit. A sound device 187 may be set off in the cab of the truck and a visual device 188 provided to inform the operator of his location. Spring 190 is attached to arm 185 in a fixed surface nearby and the spring will return the arm to its normal position. Arm 185 is pivoted against stops so that the spring 190 will not return it beyond the vertical position. It is apparent that arm 185 may be placed in any position where it is likely to be rotated by contact with a part of the truck or carrier approaching the proper location.

Figure 20:
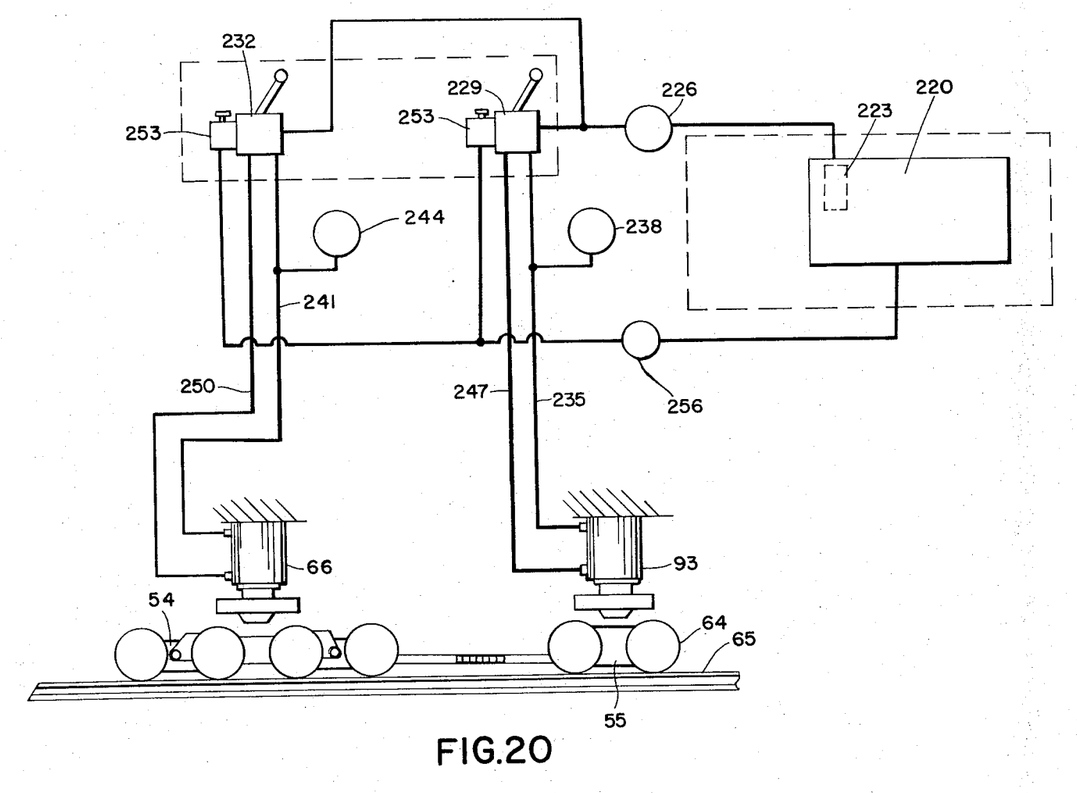
FIG. 20 shows a schematic of the hydraulic system for a truck equipped with hydraulic lift cylinders.

FIG. 20 illustrates the hydraulic system used to actuate the lift cylinders 66, 93 of the carriers 54, 55 when the cylinders are affixed to and move about with the truck 50. Hydraulic lift cylinder 93 is attached to and disposed beneath the rear of the truck. Hydraulic lift cylinder 66 is disposed beneath and attached to the front of the truck.

Hydraulic oil is maintained in a tank 220 of conventional construction. The hydraulic oil may be picked up by a straining or filtering means 223 and pressured by a conventional pump 226, whereupon the pressurized oil passes to normally open valves 229, 232 of conventional construction. Closing of the valve 229 causes pressure to travel through a conduit 235 to extend the piston of hydraulic cylinder 93 until it strikes the rear carrier 55, thereby lifting the rear of the truck. The pressure of the oil in the hydraulic cylinder 93 is recorded by a pressure gauge 238. The scale may be calibrated to show either oil pressure or the actual weight in pounds lifted by the hydraulic cylinder.

Closing of the valve 232 causes pressure to travel through a conduit 241 to extend the piston of the hydraulic cylinder 66 until it strikes the front carrier 54 thereby lifting the front of the truck. The pressure of the oil in the hydraulic cylinder 66 is recorded by a pressure gauge 245 whose scale may be calibrated to show either oil pressure or the actual weight in pounds lifted by the hydraulic cylinder.

The valve 229 can also be placed in such a manner so as to direct pressure through another conduit 247 to cause the piston of the hydraulic cylinder 93 to retract into said cylinder.

The valve 232 can also be closed in such a manner as to direct pressure through another conduit 250 to cause the piston of the hydraulic cylinder 66 to retract into the cylinder.

The entire hydraulic circuit is protected from rupture by over-pressure by relief valve 253. To return line to the tank 220 may channel the hydraulic oil through a strainer 256.

In view of this description many alternatives are apparent. In the scope of this invention includes the obvious modification of those embodiments described in which fall within the scope of the claims. For example, it is obvious that a truck 50 upon carrier assembly 53 may push or pull another truck or carrier with the second truck being partially or completely upon its carrier. Also, when both such trucks have rear wheels in contact with the ground, the first truck 50 could remotely control a propulsion in braking of the second truck to provide a tandem assembly.

What is claimed is:

1. In combination:
   a carrier assembly having front and rear flanged wheels adapted to be mounted upon rails for transportation thereon, said assembly adapted to support a motor vehicle;
   a motor vehicle having front and rear pneumatic tired wheels, said vehicle rotatably supportable upon the carrier assembly with the front tired wheels raised off the ground and the rear tired wheels raised off the ground and the rear tired wheels supported partially on the ground and partially on the carrier, the carrier being detachable from the motor vehicle;
   means for lifting and lowering the front tired wheels and for rotatably supporting the vehicle upon the carrier assembly; and
   means for lifting and lowering the rear tired wheels and for rotatably supporting the vehicle upon the carrier assembly.

2. A combination as recited in claim 1 wherein the means for lifting and lowering the front tired wheels comprises:
   a first hydraulic lift cylinder having a rotatable, extensible piston;
   a first substantially vee-shaped wedge mounted on one end of the piston;
   a first vee-shaped trough adapted to receive the wedge upon extension of the piston and to nest the wedge on its internal surfaces; and
   means for operating the first hydraulic lift cylinder and extending and withdrawing the piston.

3. A combination as recited in claim 2 wherein the means for lifting and lowering the rear tired wheels comprises:
   a second hydraulic lift cylinder having a rotatable extensible piston;
   a second substantially vee-shaped wedge mounted on one end of the second lift cylinder piston;
   a second vee-shaped trough adapted to receive the second wedge upon extension of the second piston and to nest the wedge on its internal surfaces; and
   means for operating the second hydraulic lift cylinder and extending and withdrawing the second piston.

4. A combination as recited in claim 3 wherein the carrier assembly comprises:
   a front carrier having the front flanged wheels;
   a rear carrier having the rear flanged wheels; and
   flexible linkage connecting the front carrier and the rear carrier.

5. A combination as recited in claim 4 wherein:
   the first hydraulic lift cylinder is mounted on the front carrier at the approximate center;
   the first trough is mounted on the frame of the motor vehicle at the approximate front and center and above the first hydraulic cylinder;
   the second hydraulic lift cylinder is mounted on the rear carrier at the approximate center; and
   the second trough is mounted on the frame of the motor vehicle at the approximate rear and center and above the second hydraulic cylinder.

6. A combination as recited in claim 4 wherein:

the first hydraulic lift cylinder is mounted on the frame of the motor vehicle at the approximate front and center;
the first trough is mounted in the center of the carrier below the hydraulic lift cylinder;
the second hydraulic lift cylinder is mounted on the frame of the motor vehicle at the approximate rear and center; and
the second trough is mounted in the center of the rear carrier below the second hydraulic lift cylinder.

7. A combination as recited in claim 6 and further comprising:
means to grip the carrier assembly to the underside of the motor vehicle for transportation therewith; and
means to release the carrier assembly from the underside of the motor vehicle for placement on the rails.

8. A combination as recited in claim 7 and further comprising:
means for detecting the location of the first hydraulic lift cylinder over the first trough.

9. A combination as recited in claim 8, and further comprising:
means for detecting the location of the second hydraulic lift cylinder over the second trough.

10. A combination as recited in claim 9, and further comprising:
means for signalling the operator of the motor vehicle of detected location of the first lift cylinder and of the second lift cylinder.

11. A combination as recited in claim 10 and further comprising;
front brakes mounted upon the front carrier to prevent rotation of carrier wheels when the wedge is not nesting in the first trough and to allow rotation when the wedge is nesting in the first trough; and
rear brakes mounted upon the rear carrier to prevent rotation of the rear carrier wheels when the wedge is not nesting in the second trough and to allow rotation when the wedge is nesting in the second trough.

* * * * *